Patented Aug. 3, 1948

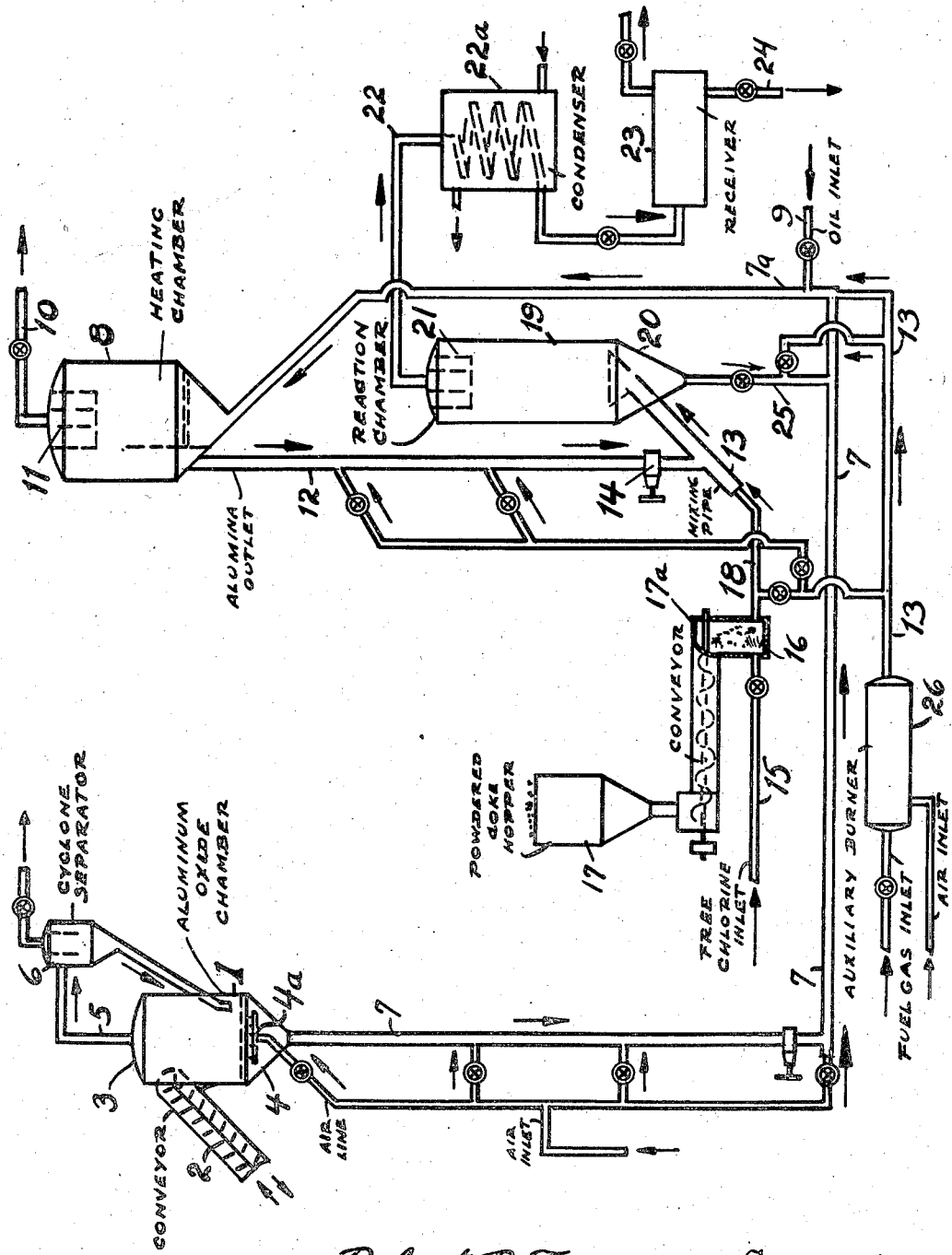

2,446,221

UNITED STATES PATENT OFFICE 2,446,221

PRODUCING ALUMINUM HALIDES BY THE REACTION OF ALUMINA, CARBON, AND FREE HALOGEN

Robert P. Ferguson, Cranford, N. J., assignor to Standard Oil Development Company, a corporation of Delaware Application March 6, 1943, Serial No. 478,311

13 Claims. (Cl. 23—94)

1

The present invention relates to the manufacture of volatile metal halides, such as aluminum chloride, and more particularly to a new process for effecting the production of such volatile halides by reaction of metal oxides with carbon and free halogen. The invention will be understood from the following description and the drawing.

The drawing is a semi-diagrammatic view in elevation of an apparatus illustrating the manufacture of aluminum chloride and indicates the flow of various materials.

The manufacture of volatile metal halides such as aluminum chloride, aluminum bromide and the like have been known for many years in the past, but most of the processes devised have been difficult to operate and control and improvement is much to be desired. The process can best be illustrated by the manufacture of aluminum chloride which is also the most important material of the particular class of materials. The chemical reactions on which the present method is based have been known for some time and the present invention comprises a better method of effecting the reaction. According to these reactions, bauxite or any other form of aluminum oxide while in admixture with coke or other forms of carbon, is heated to a high temperature while free chlorine is added. Under proper conditions the aluminum chloride is formed together with carbon monoxide and both materials are removed in gas phase and subsequently the aluminum chloride is condensed from the gas in a relatively pure form.

The present invention contemplates the manufacture of aluminum chloride and other such materials in a continuous manner involving the reactions outlined herebefore but in a new technique in which powdered alumina, carbon and chlorine are continuously fed and the product is continuously removed.

Referring to the drawing, numeral 1 denotes an elevated chamber into which finely divided aluminum oxide is fed by a feeding device shown as screw conveyor 2. The feed chamber is fitted with a closed top 3 and a conical bottom 4. Air is blown into the bottom of the hopper by a pipe 4a and the finely divided alumina is dispersed in the air so as to form what may be described as a suspended or "fluidized" mixture which will be described more fully below. It will be sufficient here to say that the mixture is capable of flowing like a liquid through various vessels and pipes. Pipe 5 is provided to take air from the chamber 1 and the powder is recovered from this air in a separator 6 which returns the solid to the hopper.

The suspension or fluidized mixture passes downwardly through a pipe 7 and then upwardly through a leg 7a and into the bottom of an elevated heating chamber 8. Oil or other fuel may be fed into the line 7a by a pipe 9 and is burned in the chamber 8 so as to raise the alumina therein to a high temperature of the order of 1200 to 1500° F.

The chamber 8 is provided with a pipe 10 to take off the gases which, however, are freed from powdered solid in a cyclone separator 11 which may be constructed in the upper part of the chamber 8, as shown. Other types of separators may, of course, be employed in place of 11 or in connection therewith. If desired, the same separation equipment may be used for chambers 1 and 8, with some saving, if convenient.

It will be understood that the powdered solid is in suspension in the heating chamber 8 just as is also the condition in the feed chamber 1 and in the flow lines 7 and 7a. The heated alumina suspension is withdrawn from chamber 8 by a pipe 12 which passes downwardly joining a mixing pipe 13 after passing through a control valve 14.

Free chlorine is fed by a pipe 15 and, preferably after receiving some preheat, passes into the mixing chamber 16 which is also fed with powdered coke from the hopper 17 by means of a compression screw 17a. The suspension of carbon in the gaseous chlorine then passes by pipe 18 into the mixing pipe 13, which has been mentioned above, where it is thoroughly distributed through and intercommingled with the suspension of heated alumina from the chamber 8. This mixture then passes upwardly into a reaction chamber 19 which is in the form of a vertical cylinder with a conical base 20. The reaction proceeds rapidly within the vessel since the ingredients are at high temperature and in finely divided form and thoroughly mixed. The temperature is of the order of 1200 to 1500° F., sufficient to permit the formation of volatile aluminum chloride and to maintain it in vapor phase. The vapors and gases, which consist mainly of carbon monoxide, and the volatile halide with or without a small amount of chlorine, leave the top of the reactor 19 through a cyclone separator 21 and the dust-free gas passes off through pipe 22 to a cooler which condenses the aluminum chloride. This is then collected in a receiver 23 and is withdrawn by pipe 24.

Returning to the reactor 19, it will be understood that the contents thereof are in the suspended or fluidized state as mentioned above and a stream of this material is continuously withdrawn through a pipe 25 and discharges into the pipe 7, so that the suspension withdrawn is thus recirculated to the heating chamber 8, mentioned above, along with the fresh alumina fed to the system. This recirculation of the alumina to the heating chamber maintains the required temperature in the reactor.

In starting up the process, aluminum oxide is first circulated through the system, without chlorine or carbon, and oil or gas first is fed at the pipe 9, so that gradually the temperature is raised to the operating level. Thereafter the oil feed may be discontinued or gradually reduced. During the starting period, hot flue gas is also prepared in an auxiliary burner 26 which is fed with fuel and air and the combustion gas is passed into the mixing pipe 13 which supplies the pipe 7a and at other points, as shown in the drawing, in order to maintain the solid materials in suspended or "fluidized" condition. When the operating temperature is reached, the fluid gas being fed may be gradually reduced or eliminated and the chlorine and carbon are now fed from the pipe 15 and carbon from the hopper 17.

The heat for the system when it is finally on stream comes largely from the combustion of the added carbon. There should therefore be fed an excess of carbon over that required for the reduction of aluminum oxide and the solids withdrawn from the base of the reactor 19 consist largely of aluminum oxide with a minor proportion of carbon which is then burned in the heating chamber 8. The temperature of the heating chamber is held at a point somewhat above that of the reactor and the aluminum oxide carries the heat from the heating chamber into the reaction chamber, thus serving a function in addition to its principal use as a reactant.

It will be noted that the solids have been said to flow through the pipes and the reactors in a suspension in the gas, such suspension being of a dispersed and continuously flowing character which may be referred to as a "fluidized" state. The solids should be finely divided, preferably smaller than 50 mesh in order to be thus dispersed and suspended and when distributed in a small volume of gas, the resulting suspension has been observed to flow much as a liquid, exhibiting both static and dynamic heads. The dispersion of aluminum oxide in air or other gas can be made with a density of say 45 to 55 pounds per cubic foot and the flow through the pipes is induced by adjusting the density of opposing columns of the suspension. Thus the suspension within the pipe 7 is considerably heavier than that in pipe 7a or in pipe 13, due to the relatively large volume of the gas which is added to these lines and which necessarily reduces the solids content and consequently the density of the suspension. Similarly the density of the suspension flowing through the reactor 19 is greater than that in the riser pipe 7a so that the flow is out of the bottom of the reactor 19 through pipe 25 and up through 7a. In this way it is not necessary to provide pumps to operate on the powder containing gases.

Within the reactor the temperature is of the order of 1200 to 1500° F., and the chlorine, alumina and carbon are thoroughly admixed and maintained in a continuously suspended state. It is desirable to always provide an excess of aluminum oxide over the amount of chlorine required for reaction so that the gases leaving the reactor will contain only small amounts of chlorine. The velocity of gas in the reactor is maintained within the preferred range of about 1 to 5 feet per second, so as to keep the solid materials in suspension and providing the mixing that is required. If higher velocities are employed, much of the solid will be carried overhead to the cyclone separator and more separator capacity will have to be provided.

The process, once it has been started, can be made fully continuous, the alumina and the carbon being fed as a suspension, that is, in a dispersed and continuously suspended form, the alumina suspended in air and the carbon suspended in the chlorine, just as shown in the drawing. From the chemical equation set out below it will be seen that some 48 pounds of alumina and 17 pounds of carbon are required per 100 pounds of chlorine gas, $$Al_2O_3 + 3C + 3Cl_2 \rightarrow 2AlCl_3 + 3CO$$

Much of the heat of reaction can be supplied by the burning of the excess carbon and 20 to 25 pounds are ordinarily supplied for the purpose of reaction and heat supply. As indicated above, an excess of alumina should always be present in the reactor over and above the amount of chlorine. These materials will, of course, be fed to the system in substantially the proportions required for the chemical reaction, but the amount in the system at any one time or, in other words, the amount that is fed directly into the reactor through the mixing tube, will be substantially from 75 to 100 pounds of alumina for 100 pounds of chlorine. While the process has been described and illustrated for the manufacture of aluminum chloride, it will be understood that other volatile halides can be made in the same manner. Similarly, instead of free chlorine and carbon, certain compounds of chlorine can be used, for example carbonyl chloride or sulfur monochloride can be employed, but carbon with chlorine and the other free halogens are ordinarily to be preferred. The reaction vessel is preferably maintained at approximately atmospheric pressure or at moderate pressure of say 10 to 50 pounds.

Variations may be made in the details of the process without departing from the spirit of the invention. Thus, the coke may be fed from a standpipe instead of a screen or vice versa the alumina may be supplied by a screen instead of the standpipe. The relative positions of the reaction vessel 19 and the combustion or heating chamber 8 may be reversed, the only changes necessary being that in such case the heater 8 will be at a slightly higher pressure than the reaction vessel 19. The flow of material may be effected in the same manner.

I claim:

1. An improved process for producing volatile metal halides which comprises preparing a suspension of finely divided solid metal oxide, in air and a combustible material, passing the same into a combustion zone wherein the combustible material is burned and the metal oxide is heated to a reactive temperature, withdrawing the products of combustion, separately withdrawing a stream of the suspended highly heated solid metal oxide, adding said stream along with a stream of suspended finely divided carbon in a gaseous halogen to a reaction zone wherein the metal halide vapor is formed, withdrawing the vapor and recovering the metal halide therefrom, withdrawing a separate stream of the suspended solid metal oxide and returning the same to the combustion zone.

2. Process according to claim 1 in which the powdered solids are fed to the reaction zone in excess of the amounts required for reaction with the free halogen, withdrawing a stream of suspended powdered oxide, heating this stream to elevated temperature and returning the heated stream to the reaction zone to maintain the same at reaction temperature and to furnish the heat required for the reaction.

3. Process according to claim 1 in which a stream of suspended powdered metal oxide containing carbon is withdrawn from the reaction zone and carbon therein is burned with air so as to heat the stream of suspended solid metal oxide to an elevated temperature, and returning the stream to the reaction zone so as to maintain it at reaction temperature and furnish heat of reaction.

4. In the known process for producing volatile metal halides by reaction of a metal oxide, carbon and free chlorine, the improvement comprising continuously passing a stream of carbon suspended in chlorine gas into a vertical reaction zone, continuously adding to the reaction zone a stream of suspended finely divided solid metal oxide heated to a temperature above that required for the reaction, whereby the reaction zone is maintained at the reaction temperature and volatile metal chloride is produced, withdrawing vaporized metal chloride from the reaction zone and recovering it from powdered oxide and carbon, withdrawing a stream of suspended solid metal oxide and carbon from the reaction zone, burning the carbon therein with air so as to produce the suspension of highly seated solid metal oxide before mentioned.

5. Process according to claim 4 in which the suspended mixture within the reaction zone contains an excess of metal oxide over that required for reaction with the chlorine.

6. Process according to claim 4 in which the suspended mixture within the reaction zone contains an excess of metal oxide over that required for reaction with the chlorine and also an excess of carbon over that required for reaction with the metal oxide.

7. In the known process for producing aluminum halides by reaction of alumina, carbon and free halogen, the improvement comprising continuously passing a suspension of carbon in a gaseous halogen into a vertical reaction zone, continuously passing a stream of a suspension of highly heated solid alumina in combustion gas into the same zone whereby the halogen and carbon are raised to a reaction temperature and aluminum halide is produced, the amount of alumina and carbon within the reactor at any one time being in excess of that required for reaction with the halogen, continuously withdrawing vaporized aluminum halide and recovering the same, continuously withdrawing a stream of a gas suspension of solid alumina and carbon from the reaction zone, adding air thereto and burning the carbon, whereby the alumina is heated to a high temperature, and continuously returning the resulting stream of suspended highly heated solid alumina in combustion gas to the reaction zone, to maintain its temperature and supply heat for the reaction.

8. Process according to claim 7 in which finely divided alumina for the system is suspended in air and mixed with the withdrawn stream of aluminum oxide and carbon from the reaction zone.

9. Process according to claim 7 in which combustion gas is added to the suspended material passing into the reaction zone.

10. Process according to claim 7 in which a suspended stream of alumina is caused to flow in a closed circuit consisting of a heating and combustion zone, which zones are at different levels, by adjusting the density of the flowing streams.

11. Process according to claim 1, in which the upward velocity of gas in the reaction zone is in the range of about 1 to 5 feet per second.

12. Process according to claim 4, in which the upward velocity of gas in the reaction zone is in the range of about 1 to 5 feet per second.

13. Process according to claim 7, in which the upward velocity of gas in the reaction zone is in the range of about 1 to 5 feet per second.

ROBERT P. FERGUSON.

REFERENCES CITED

The following references are of record in the file of this patent:

UNITED STATES PATENTS

| Number | Name | Date |
| --- | --- | --- |
| 1,268,015 | King et al. | May 28, 1918 |
| 1,366,626 | Alexander | Jan. 25, 1921 |
| 1,984,380 | Odell | Dec. 18, 1934 |